(12) United States Patent
Shivalingappa et al.

(10) Patent No.: US 10,911,745 B2
(45) Date of Patent: Feb. 2, 2021

(54) CALIBRATION OF A SURROUND VIEW CAMERA SYSTEM

(71) Applicant: Texas Instruments Incorporated, Dallas, TX (US)

(72) Inventors: Sujith Shivalingappa, Bangalore (IN); Vikram Appia, Dallas, TX (US); Anand Yalgurdrao Kulkarni, Bangalore (IN); Do-Kyoung Kwon, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 133 days.

(21) Appl. No.: 15/393,168

(22) Filed: Dec. 28, 2016

(65) Prior Publication Data

US 2018/0184078 A1    Jun. 28, 2018

(51) Int. Cl.
*H04N 7/18* (2006.01)
*G06K 9/00* (2006.01)
*B60R 1/00* (2006.01)
*G06K 9/32* (2006.01)
(Continued)

(52) U.S. Cl.
CPC ............. *H04N 17/002* (2013.01); *B60R 1/00* (2013.01); *G06K 9/00791* (2013.01); *G06K 9/3216* (2013.01); *H04N 7/181* (2013.01); *B60R 2300/102* (2013.01); *B60R 2300/105* (2013.01);
(Continued)

(58) Field of Classification Search
None
See application file for complete search history.

(56) References Cited

U.S. PATENT DOCUMENTS

2007/0127774 A1* 6/2007 Zhang ................ G06K 9/00771
382/103
2010/0194886 A1    8/2010 Asari
(Continued)

OTHER PUBLICATIONS

Richard Hartley and Andrew Zisserman, "Multiple View Geometry in Computer Vision", Cambridge University Press, New York, NY, Apr. 2004, chapters 4 and 7, pp. 87-131 and 178-194.
(Continued)

*Primary Examiner* — Clifford Hilaire
(74) *Attorney, Agent, or Firm* — Charles F. Koch; Charles A. Brill; Frank D. Cimino

(57) ABSTRACT

A method for automatic generation of calibration parameters for a surround view (SV) camera system is provided that includes capturing a video stream from each camera comprised in the SV camera system, wherein each video stream captures two calibration charts in a field of view of the camera generating the video stream; displaying the video streams in a calibration screen on a display device coupled to the SV camera system, wherein a bounding box is overlaid on each calibration chart, detecting feature points of the calibration charts, displaying the video streams in the calibration screen with the bounding box overlaid on each calibration chart and detected features points overlaid on respective calibration charts, computing calibration parameters based on the feature points and platform dependent parameters comprising data regarding size and placement of the calibration charts, and storing the calibration parameters in the SV camera system.

12 Claims, 9 Drawing Sheets

(51) Int. Cl.
*G06K 9/20* (2006.01)
*H04N 17/00* (2006.01)

(52) U.S. Cl.
CPC ............ *B60R 2300/402* (2013.01); *G06K 2009/2045* (2013.01); *G06K 2009/3225* (2013.01)

(56) References Cited

U.S. PATENT DOCUMENTS

| | | | |
|---|---|---|---|
| 2013/0127991 A1* | 5/2013 | Oh | H04N 19/597 348/43 |
| 2015/0254825 A1* | 9/2015 | Zhang | B60R 1/00 382/284 |
| 2015/0302561 A1 | 10/2015 | Pekkucuksen | |
| 2017/0206674 A1* | 7/2017 | Westerhoff | G06T 7/97 |
| 2018/0232893 A1* | 8/2018 | Tanaka | H04N 7/181 |

OTHER PUBLICATIONS

Vikram Appia et al, "Surround View Camera System for ADAS on Ti's TDAx SoCs", Texas Instruments, SPRY270A, Oct. 2015, pp. 1-18.

Zoran Nikolic, et al, 'TDA3x SoC Processor Delivers Cost-Effective ADAS Solutions for Front, Rear and Surround View Applications, Texas Instruments, SPRY272, Oct. 2014, pp. 1-10.

Do-Kyoung Kwon, et al, "Automatic Feature Point Detection for Calibration of Multi-Camera Systems", U.S. Appl. No. 15/294,369, filed Oct. 14, 2016, pp. 1-36.

Vikram Appia et al, "Three Dimensional Rendering for Surround View Using Predetermined Viewpoint Lookup Tables", U.S. Appl. No. 15/298,214, filed Oct. 19, 2016, pp. 1-37.

Buyue Zhang et al, "A Surround View Camera Solution for Embedded Systems", 2014 IEEE Conference on Computer Vision and Pattern Recognition Workshops (CVPRW), Jun. 23-28, 2014, pp. 662-667.

* cited by examiner

CALIBRATION OF A SURROUND VIEW CAMERA SYSTEM

BACKGROUND OF THE INVENTION

Field of the Invention

Embodiments of the present invention generally relate to surround view camera systems and more specifically relate to calibration of such a system.

Description of the Related Art

The automotive surround view (SV) camera system is an emerging technology in the advanced driver assistance systems (ADAS) and market space. While originally used to assist the driver of a vehicle in parking the vehicle safely by presenting the driver with a top-down view of the 360 degree surroundings of the vehicle, automotive SV camera systems are increasingly being deployed as part of autonomous driving and autonomous parking. An automotive SV camera system typically includes four to six wide-angle (fish-eye lens) cameras mounted around the vehicle, each facing a different direction. From these camera inputs, a composite view of the surroundings of the vehicle is synthesized.

Prior to deployment or when maintenance is needed, an automotive SV camera system must be calibrated to provide for proper integration of the images captured by the multiple cameras. Without proper calibration, the integrated images produced by the system may be inaccurate.

SUMMARY

Embodiments of the present invention relate to methods and systems for calibrating a surround view camera system. In one aspect, a method for automatic generation of calibration parameters for a surround view (SV) camera system is provided that includes capturing a video stream from each camera of a plurality of cameras comprised in the SV camera system, wherein each video stream captures two calibration charts in a field of view (FOV) of the camera generating the video stream, displaying the video streams in a calibration screen on a display device coupled to the SV camera system, wherein a bounding box is overlaid on each calibration chart, detecting feature points of the calibration charts in an image from each video stream, displaying the video streams in the calibration screen with the bounding box overlaid on each calibration chart and detected features points overlaid on respective calibration charts, computing calibration parameters for the SV camera system based on the feature points and platform dependent parameters comprising data regarding size and placement of the calibration charts, and storing the calibration parameters in the SV camera system.

In one aspect, a method for automatic generation of calibration parameters for a surround view (SV) camera system is provided that includes starting, by a technician, a calibration process comprised in the SV camera system, reviewing, by the technician, a calibration screen on a display device coupled to the SV camera system, the calibration screen comprising video streams captured from each camera of a plurality of cameras comprised in the SV camera system, wherein each video stream captures two calibration charts in a field of view (FOV) of the camera generating the video stream, and wherein a bounding box is overlaid on each calibration chart, initiating, by the technician, computation of calibration parameters by the calibration process, wherein the computation is based on feature points detected in the calibration charts comprised in images from each video stream and platform dependent parameters comprising data regarding size and placement of the calibration charts, and reviewing, by the technician, the calibration screen with the bounding box overlaid on each calibration chart and the detected feature points overlaid on respective calibration charts, wherein locations of the features points on the calibration charts are indicative of accuracy of the calibration parameters.

In one aspect, a surround view (SV) camera system is provided that includes a plurality of cameras, a display device, a memory storing software instructions for generating calibration parameters for the SV camera system, and a processor coupled to the memory to execute the software instructions. The software instructions comprise software instructions to capture a video stream from each camera of the plurality of cameras, wherein each video stream captures two calibration charts in a field of view (FOV) of the camera generating the video stream, display the video streams in a calibration screen on the display device, wherein a bounding box is overlaid on each calibration chart, detect feature points of the calibration charts in an image from each video stream, display the video streams in the calibration screen with the bounding box overlaid on each calibration chart and detected features points overlaid on respective calibration charts, compute calibration parameters for the SV camera system based on the feature points and platform dependent parameters comprising data regarding size and placement of the calibration charts, and store the calibration parameters in the SV camera system.

BRIEF DESCRIPTION OF THE DRAWINGS

Particular embodiments in accordance with the invention will now be described, by way of example, and with reference to the accompanying drawings.

DETAILED DESCRIPTION OF EMBODIMENTS OF THE INVENTION

Figure 1:
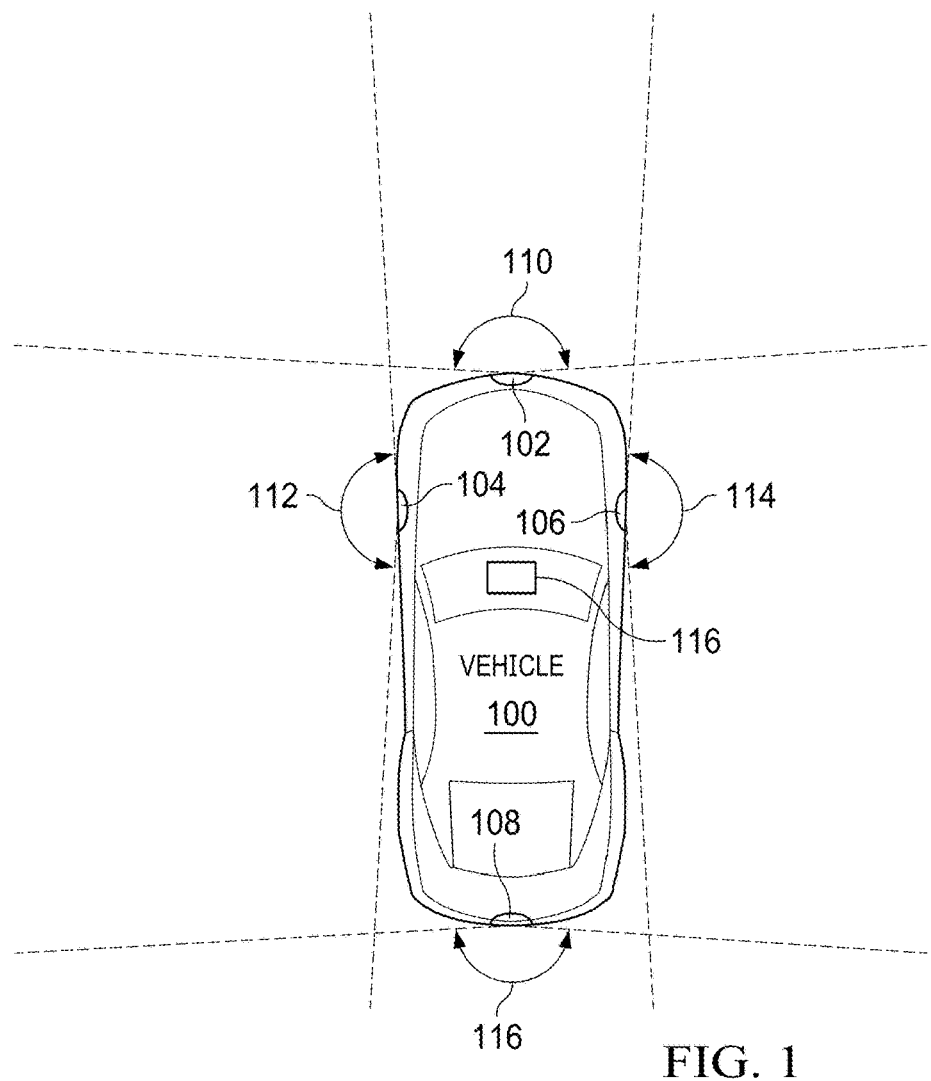
FIG. 1 is a top-down view of an example vehicle that includes an automotive surround view (SV) camera system.

Specific embodiments of the invention will now be described in detail with reference to the accompanying figures. Like elements in the various figures are denoted by like reference numerals for consistency.

An automotive surround view (SV) camera system may provide a two dimensional view or a three dimensional view of the surroundings of a vehicle, depending on the capabilities of the system. The surround view is achieved by capturing video streams from multiple cameras mounted on the periphery of the vehicle and stitching the video streams together. Cameras with a wide field of view, e.g., equipped with a fish-eye lens, are used to achieve overlap in the video captured by adjacent cameras. The overlap is critical for a high quality stitched output.

An automotive SV camera solution may include two key algorithmic components: geometric alignment, i.e., calibration, and composite view synthesis. Calibration may include lens distortion correction (LDC) to correct any fish-eye distortion in the input video frames and perspective transformation to convert the LDC corrected frames to a common birds-eye perspective. The synthesis algorithm generates the composite surround view after the calibration.

For fish-eye distortion correction, a radial distortion model may be used in which the fish-eye effect is removed by applying the inverse transformation of the radial distortion model. For perspective transformation, a transformation matrix for each camera may be computed so that all input streams are properly registered with the ground plane. Calibration parameters for the geometric alignment may be generated by an automatic calibration process performed during production of the vehicle housing the automotive SV camera system and/or performed during maintenance of the vehicle.

The geometric alignment algorithm may be based on a geometric calibration chart, also referred to as a chart or a finder pattern, designed to facilitate accurate and reliable location and matching of features. The geometric calibration chart is used during the automatic calibration process to generate the calibration parameters for the geometric alignment algorithm. More specifically, identical geometric calibration charts are placed around the vehicle such that each chart is in the field of view (FOV) of two adjacent cameras. The placement of the charts is a function of the size of the vehicle. The geometric alignment algorithm requires millimeter accurate measurements of the size of a chart and the locations of each pair of adjacent charts relative to each other.

Embodiments of the disclosure provide for generation of calibration parameters for geometric alignment of an automotive surround view (SV) camera system. In some embodiments, visual aids are provided that minimize the need for specialized skill to calibrate an automotive SV camera system. Further, in some embodiments, calibration processing that is dependent on the platform, i.e., the vehicle model, is separated from calibration processing that is independent of the platform. In addition, the platform dependent calibration processing is configured to accept platform dependent parameters as inputs rather than compiling the parameter values as constants in the software as in the prior art. Thus, the same automatic calibration software can be used for multiple platforms. As is explained in more detail herein, having the platform dependent parameters as inputs rather than constants may also simplify the process of determining the platform dependent calibration parameters.

FIG. 1 is a top-down view of an example vehicle 100 that includes an automotive SV camera system. The vehicle 100 includes four fish-eye lens cameras 102, 104, 106, 108 mounted at different points on the vehicle 100 and an SV processing system (not specifically shown) coupled to the four cameras. The SV processing system includes hardware and software to receive video streams captured by the cameras and to process the video streams to generate SV images. The vehicle 100 also includes a touch screen display device 100 in the interior of the vehicle 100 that is coupled to the SV processing system to display SV images produced by the SV processing system. The camera 102 is mounted on the front of the vehicle 100, e.g., on the grille, the cameras 104 and 106 are mounted on opposite sides of the vehicle 100, e.g., on the side-view mirrors, and the camera 108 is mounted on the rear of the vehicle 100, e.g., on the trunk door.

The cameras 102, 104, 106, 108 are positioned such that each has a respective field of view (FOV) angle 110, 112, 114, 116. As is explained in more detail herein, an automatic calibration process is performed to generate calibration parameters for the SV processing system. For the automatic calibration process, four geometric calibration charts are placed in predetermined locations around the vehicle 100 between adjacent cameras. The FOV angle of each camera is sufficient to allow the geometric calibration chart between each pair of adjacent cameras to be visible in the FOVs of each of the cameras.

Figure 2:
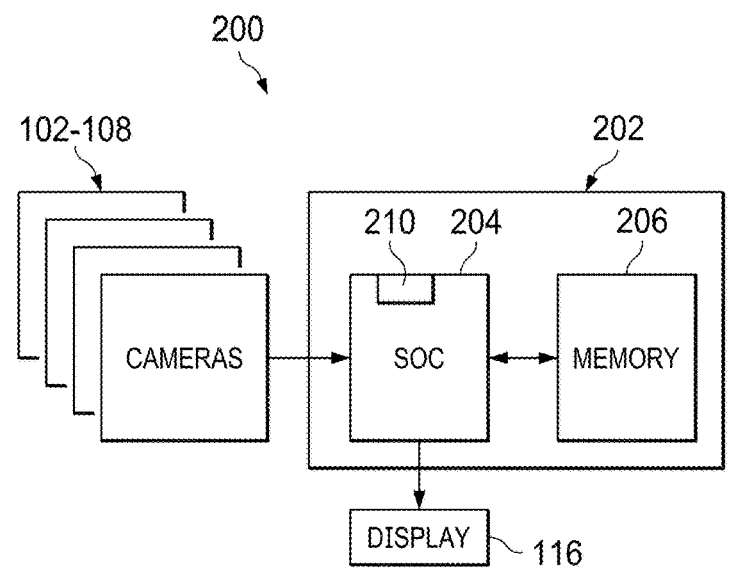
FIG. 2 is a simplified block diagram of the automotive SV camera system of FIG. 1.

FIG. 2 is a simplified block diagram of an embodiment 200 of the automotive SV camera system included in the vehicle 100 of FIG. 1. The automotive SV camera system 200 includes the cameras 102-108, the display device 116, and the aforementioned SV processing system 202 coupled to the cameras and the display device. The SV processing system 202 includes a system-on-a-chip (SOC) 204 coupled to the cameras 102-108 and the display device 116 and to a memory 206. The memory 206 may be any suitable combination of memory technologies such as, for example, random access memory, read-only memory, and/or flash memory. The memory 206 stores executable software instructions of the SV processing system 202 that may be executed on one or more processors of the SOC 204. The executable software instructions include instructions implementing an embodiment of the automatic calibration process described herein.

The SOC 210 may be any SOC suitable for real-time SV image generation. Some examples of suitable SOCs are the family of TDA2x and TDA3x SOCs available from Texas Instruments Incorporated. An example of a SV solution using a TDA3x SOC may be found in Zoran Nikolic, et al., "TDA3X SoC Processor Delivers Cost-Effective ADAS Solutions for Front, Rear, and Surround View Applications", SPRY272, Texas Instruments, October, 2014, which is incorporated by reference herein. The SOC 210 includes a port for interfacing with removable storage media 210, e.g., a micro secure digital card or a flash memory device. As is explained in more detail herein, the values of the platform dependent parameters may be determined by an offline process. During this offline process, candidate platform dependent parameters may be provided to the automatic calibration process using removable storage media to test the calibration accuracy using the candidate platform dependent parameters.

Figure 3:
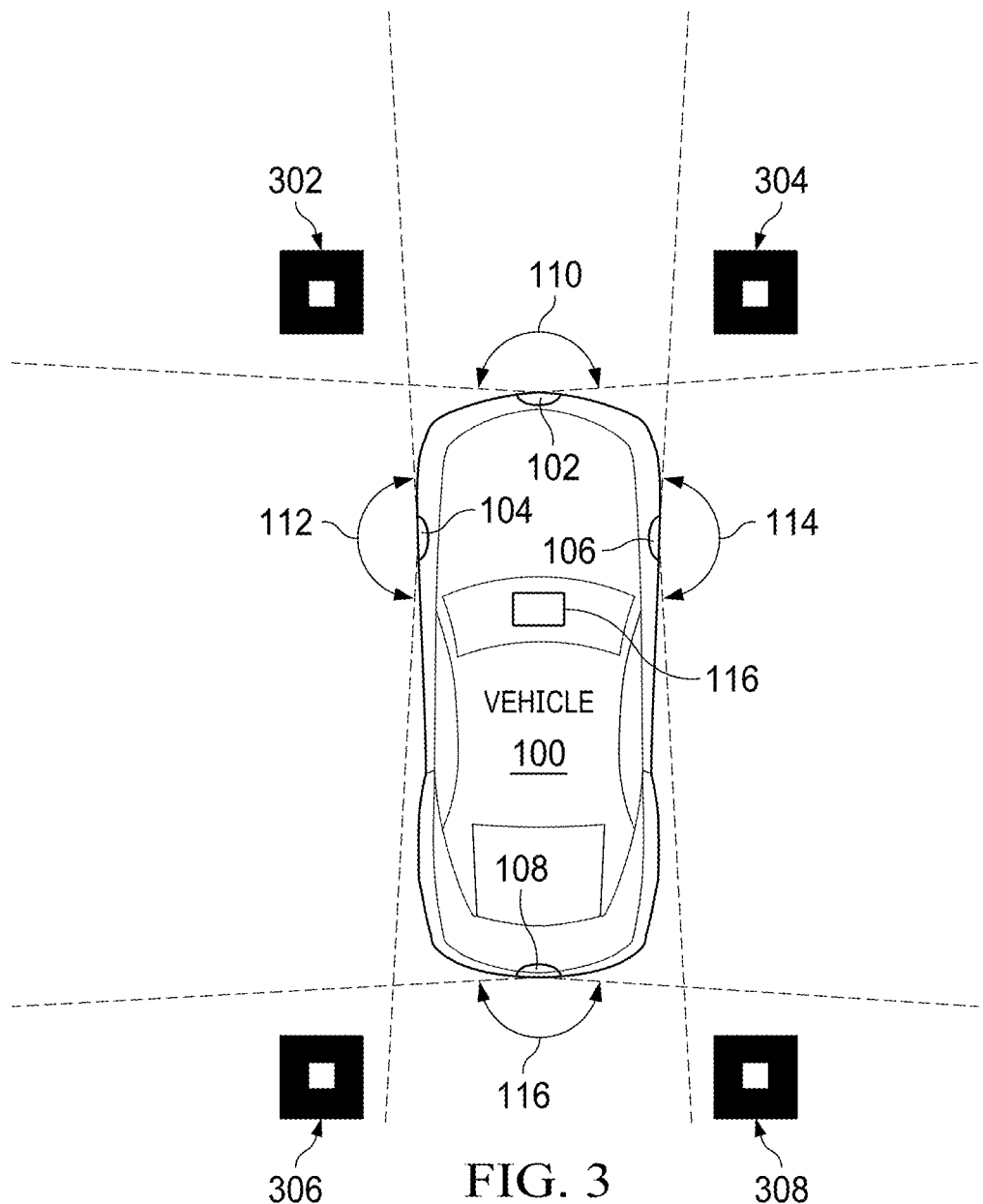
FIG. 3 depicts an example arrangement of four calibration charts around the vehicle of FIG. 1.

FIG. 3 depicts an example arrangement of four calibration charts 302, 304, 306, 308 around the vehicle 100 of FIG. 1 to be used by the automatic calibration process. The four calibration charts are positioned such images of each chart can be simultaneously captured by two adjacent cameras. Thus, images of the calibration chart 302 may be simultaneously captured by the camera 102 and the camera 104 and images of the calibration chart 304 may be simultaneously captured by the camera 102 and the camera 106. Further, images of the calibration chart 308 may be simultaneously captured by the camera 106 and the camera 108 and images of the calibration chart 306 may be simultaneously captured by the camera 108 and the camera 104. As is explained in more detail, during the automatic calibration process, the images of the charts captured by each pair of adjacent cameras are displayed on the display device 116.

Figure 4:
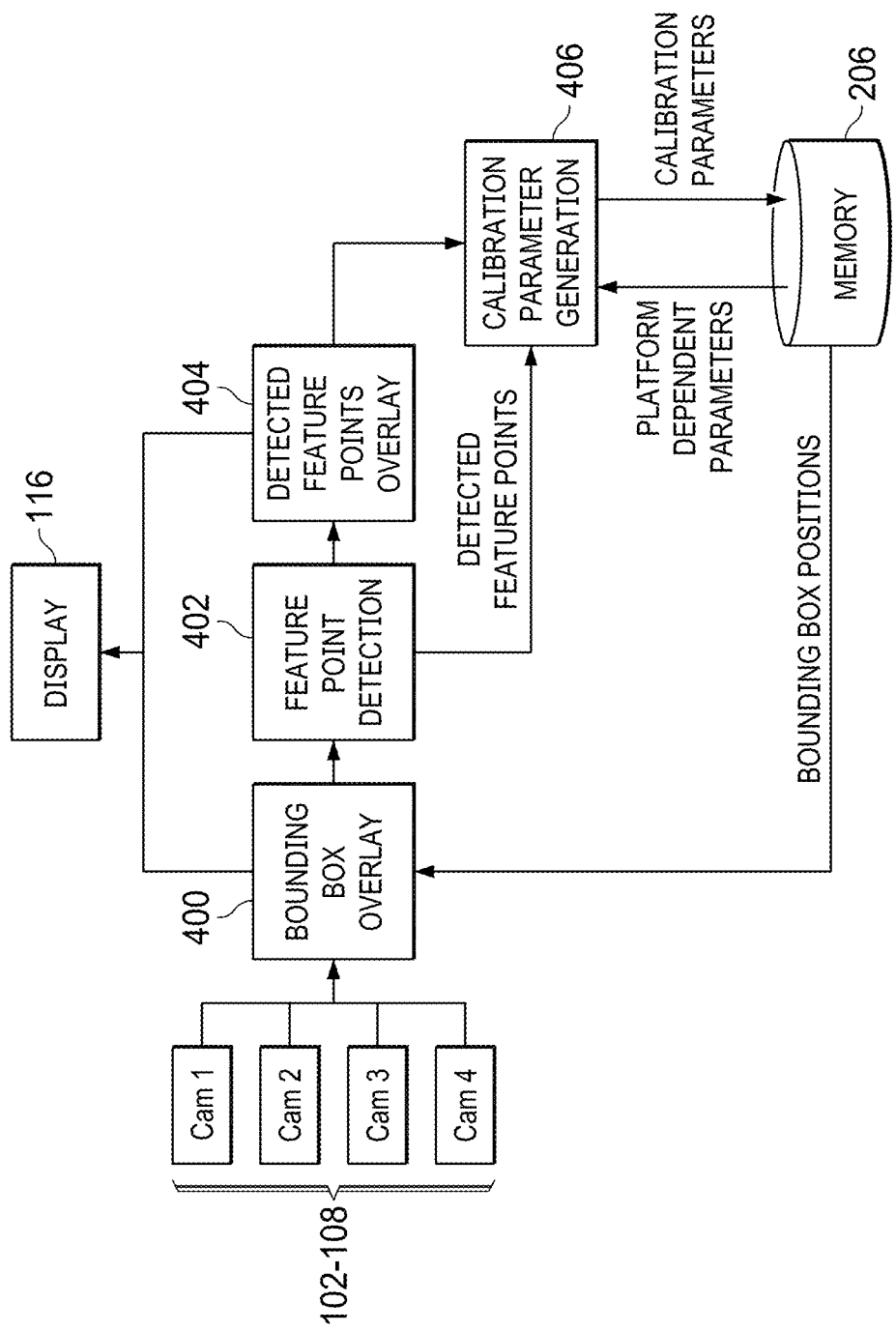
FIG. 4 is a block diagram of an automatic calibration process implemented in the automotive SV camera system of FIG. 2.

FIG. 4 is a block diagram of an automatic calibration process that may be implemented by the SV processing system 202 of FIG. 2. The components of the automatic calibration process include the bounding box overlay component 400, the feature point detection component 402, the detected feature points overlay component 404, and the calibration parameter generation component 406. The memory 206 stores the predetermined platform dependent parameters used during the automatic calibration which include the sizes of the charts 302, 304, 306, 308, the locations of the charts relative to each other, and the sizes and positions of bounding boxes. In various embodiments, some combination of other platform dependent parameters may also be stored in the memory 206, e.g., the number of cameras, lens specific parameters, viewpoint lookup tables, mesh bowl parameters, etc. Viewpoint lookup tables and mesh bowl parameters are described in U.S. patent application Ser. No. 15/298,214, filed Oct. 19, 2016, which is incorporated by reference herein.

A bounding box defines a perimeter around an image of a chart, i.e., bounds an area of an image that includes the chart. Any suitable technique may be used to determine the bound box sizes and positions. In some embodiments, the same bounding box size and position is used for all cameras. In some embodiments, the bounding box size and position may be different for some or all of the cameras. In some embodiments, the size and position of a bounding box may be determined, at least in part, by accuracy of the feature point detection using the bounding box.

Figure 5:
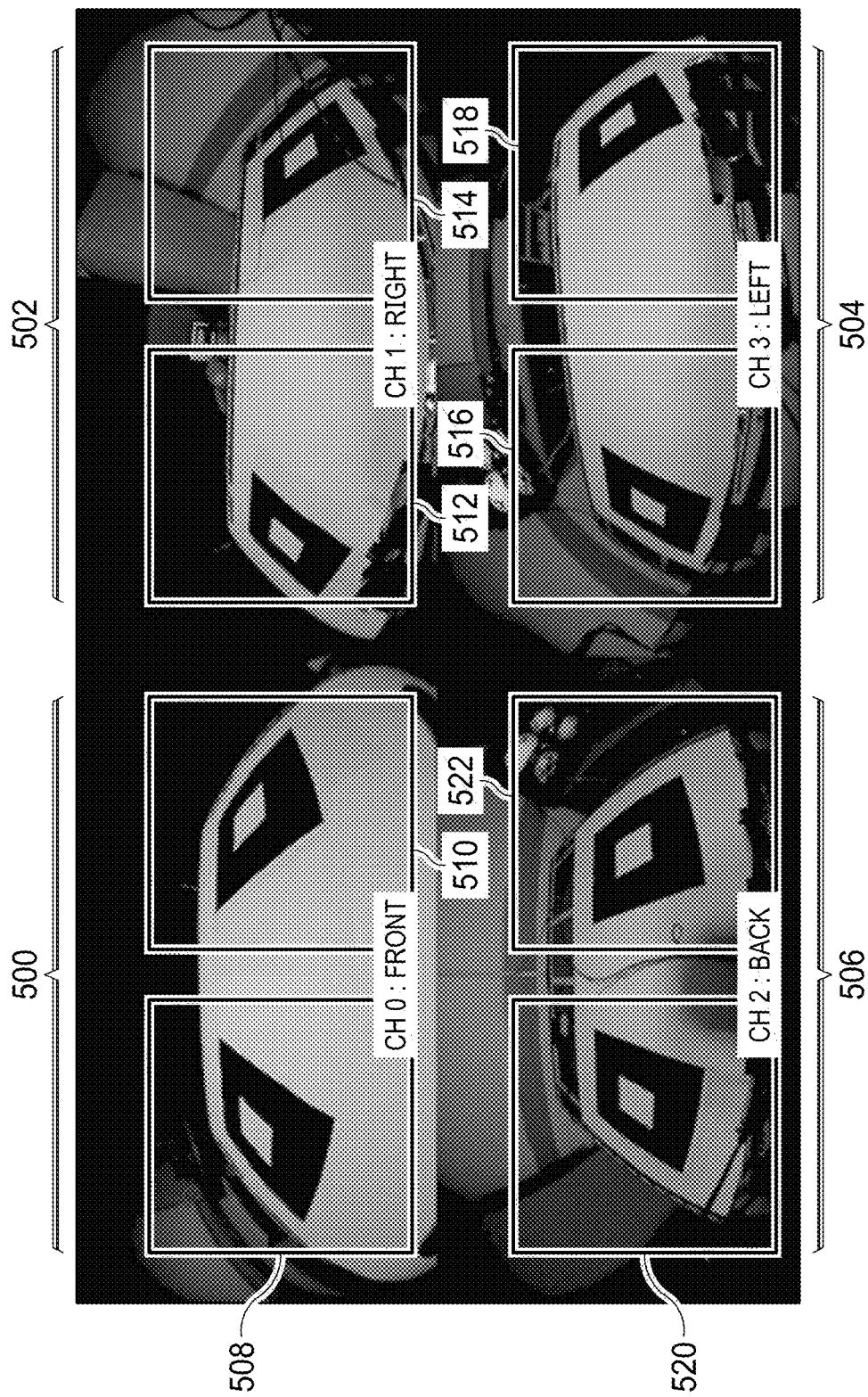
FIGS. 5 and 6 are example calibration screens.

During the automatic calibration process, a calibration screen is displayed on display device 116 that includes the video streams from the four cameras 102-108. FIG. 5 shows an example of a calibration screen. The display area 500 shows the two calibration charts captured by a camera mounted on the front of a vehicle and the display area 502 shows the two calibration charts captured by a camera mounted on the right side of a vehicle. The display area 504 and the display area 502 shows the two calibration charts captured by a camera mounted on the right side of a vehicle and the display area 506 shows the two calibration charts captured by a camera mounted on the rear of a vehicle. In this example, chart sizes and positions are slightly different for different cameras.

Referring again to FIG. 4, the bounding box overlay component 400 is configured to read the predetermined positions of bounding boxes from the memory 206 and overlay the bounding boxes on the displayed video streams. Overlaid bounding boxes 508-522 are depicted in each display area 500-506 of the example of FIG. 5. Note that there are two bounding boxes for each video stream, one for each of the two calibration charts. In this example, the same size and position is used for the left and right bounding boxes of all four cameras.

To improve the accuracy of the automatic calibration process, the two calibration charts captured by a camera may be aligned on the horizontal and vertical axes and may be approximately in the horizontal center of the corresponding bounding box. Put another way, each chart should be approximately in the center of the corresponding bounding box and the edges of the chart should be approximately parallel to the edges of the bounding box. A technician causing the automatic calibration process to be performed may use this calibration screen to, for example, verify appropriate positioning of the calibration charts and check for lighting issues or foreign objects that may interfere with the successful generation of the calibration parameters.

The feature point detection component 402 is configured to detect feature points on the calibration charts in an image captured from each of the cameras 102-108. The feature points to be detected are predetermined for the particular calibration chart in use. For the particular calibration chart shown in FIG. 3, the feature points of the calibration chart are the four corners of the black square. The feature point detection component 402 may use any suitable algorithm for feature point detection. Embodiments of an example suitable algorithm are described in U.S. patent application Ser. No. 15/294,369, filed Oct. 14, 2016, which is incorporated by reference herein. In some embodiments, the bounding boxes are used by the feature point detection to bound the area of the image to be searched for feature points. Using the bounding boxes in this way may improve the accuracy of detecting correct feature points. Further, in some embodiments, the feature points that may be detected are the corner points of the calibration charts.

Figure 6:
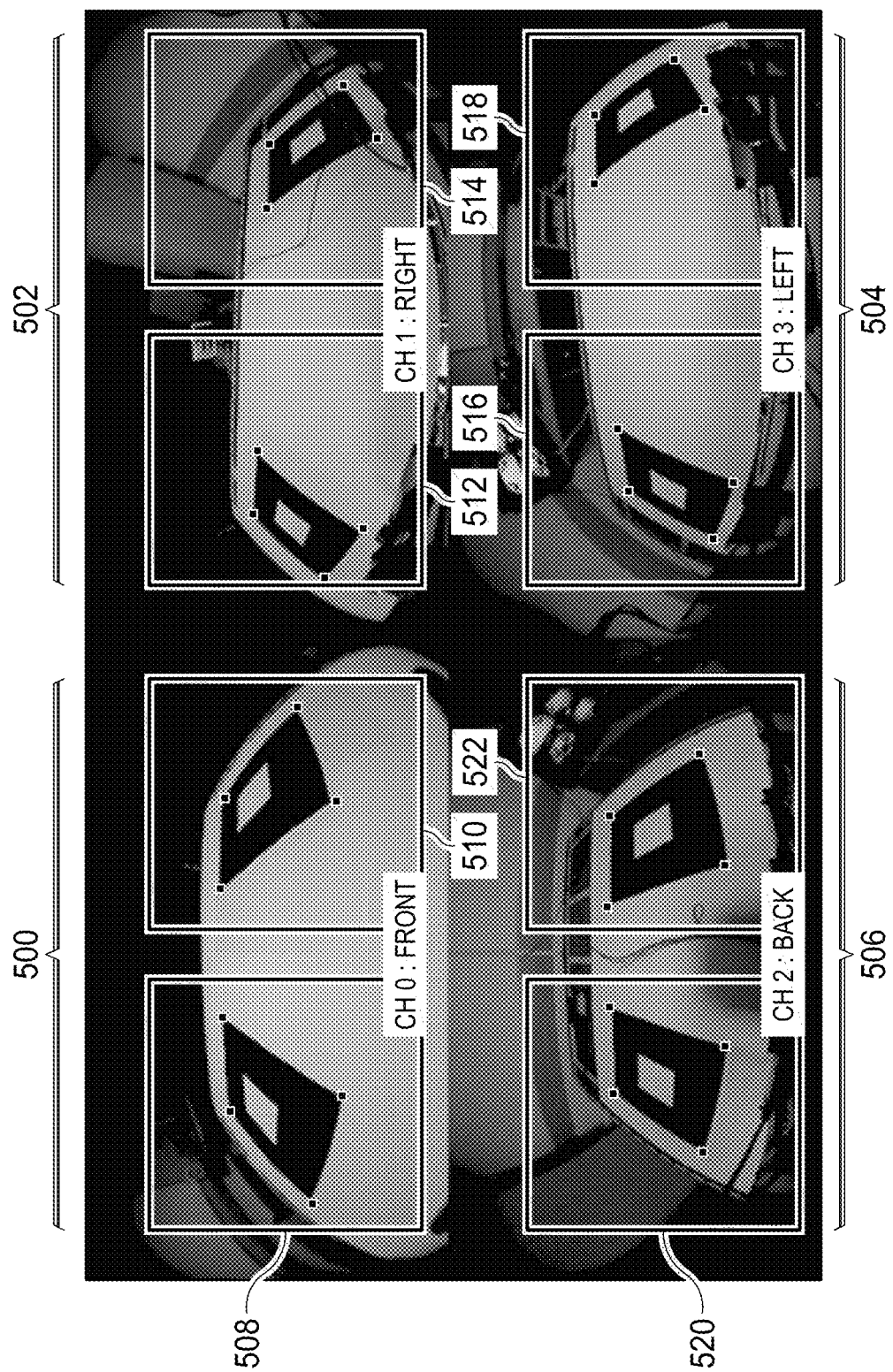

The detected feature points overlay component 404 is configured to overlay the feature points detected by the feature point detection component 402 on the displayed video streams. Overlaid detected feature points for the calibration charts shown in each display area 500-506 of the example calibration screen of FIG. 5 are shown in FIG. 6. The detected feature points are indicated by the dots at each corner of the calibration charts. A technician causing the automatic calibration process to be performed may use this calibration screen to visually confirm the accuracy of the feature point detection, which directly affects the accuracy of the generated calibration parameters.

The calibration parameter generation component 406 generates the calibration parameters for the geometric alignment algorithm of the SV processing system and stores the parameters in the memory 206. The particular calibration parameters generated may depend upon the three dimensional rendering capabilities of the SV camera system 200. For example, the parameters generated when the SOC 204 uses a graphics processing unit for rendering may be different than the parameters generated when the SOC 204 uses a two dimensional (2D) warp accelerator for rendering.

In some embodiments, the calibration parameter generation process may be performed as follows. First, two calibration matrices are generated for each camera based on the detected feature points: a rotation matrix and a translation matrix. These matrices are generated with respect to the positions of the calibration charts captured by the camera. The detected feature points and the corresponding 3D locations of these feature points are used to generate these matrices. Any suitable technique may be used to generate these matrices. Examples of some suitable techniques may be found in Chapter 4 and Chapter 7 of R. Hartley and A. Zisserman, "Multiple View Geometry in Computer Vision," Cambridge University Press, New York, 2000, 2003.

Once the rotation and translation matrices are generated for each camera, the matrices may be used together with the camera intrinsic parameters of the respective cameras to generate platform dependent lookup tables for each camera. Camera intrinsic parameters are fixed per camera and include the lens focal length and the lens distortion model. Each lookup table combines the effect of applying the matrices and the lens distortion model for the respective camera. In some embodiments, the lookup tables may be viewpoint lookup tables used for rendering SV images with a (2D) warp accelerator. U.S. patent application Ser. No. 15/298,214, previously cited herein, describes example techniques for generating such viewpoint lookup tables.

In some embodiments, the lookup table may be a vertex mapping lookup table used for rendering SV surfaces in a graphics processing unit (GPU). The GPU may divide the SV surface around a vehicle into a grid in which each point on the grid is referred to as a vertex. The vertex mapping lookup table maps each vertex in the 3D surround view surface to corresponding 2D points on the cameras. For example, a 3D location in the front and left of the vehicle will map to a 2D location in the front camera and a 2D location in the left camera. The GPU lookup table thus maps every vertex on the surface to two locations on corresponding cameras.

Figure 7:
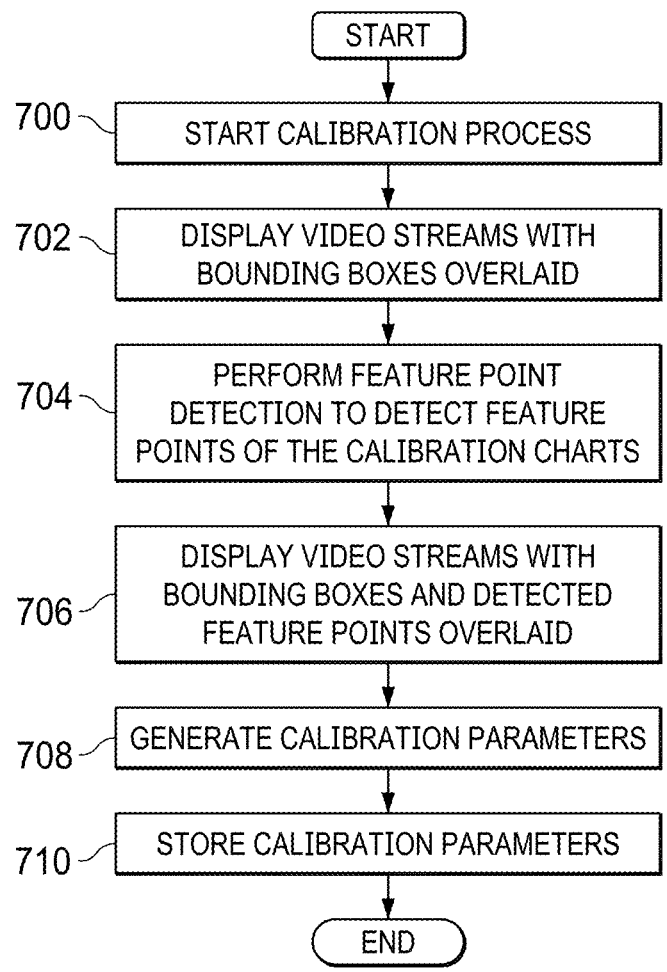
FIGS. 7 and 8 are flow diagrams of methods for generating calibration parameters for an automotive SV camera system.

FIG. 7 is a flow chart of a method for generating calibration parameters for an automotive SV camera system such as the automotive SV camera system 200 of FIG. 2. The method assumes that predetermined platform dependent parameters are available in nonvolatile memory either in the system itself or on removable media. The method also assumes that the four calibration charts are placed around the vehicle housing the automotive SV camera system according to the distances specified in the platform dependent parameters.

The calibration process is started 700 responsive to technician input. Any suitable interface may be provided for the technician to start the calibration process. For example, the calibration process may be started by a manufacturer defined sequence of button presses on buttons of the head unit of the vehicle and/or touch screen entries. Video stream capture from the cameras is initiated and the video streams are displayed 702 in a calibration screen on the vehicle display device with the bounding boxes overlaid. The technician may view the calibration screen to verify positioning of the calibration charts, lighting conditions, etc. and make adjustments as needed.

Responsive to technician input, the automatic calibration parameter generation of steps 704-710 is initiated. Any suitable interface may be provided for the technician to start the parameter generation. For example, the calibration process may be started by a manufacturer defined sequence of button presses on buttons of the head unit of the vehicle and/or touch screen entries.

Feature point detection is performed 704 to detect feature points of the calibration charts in images from the video streams. Feature point detection is previously described herein. The video streams are then displayed 706 with the bounding boxes and the detected feature points overlaid. The locations of the detected feature points may provide the technician with a visual indication of the accuracy of the feature point detection. The calibration parameters for the system are also generated 708 using the detected feature points and the calibration parameters are stored 710 in nonvolatile memory in the system. Generation of calibration parameters is previously described herein.

Figure 8:
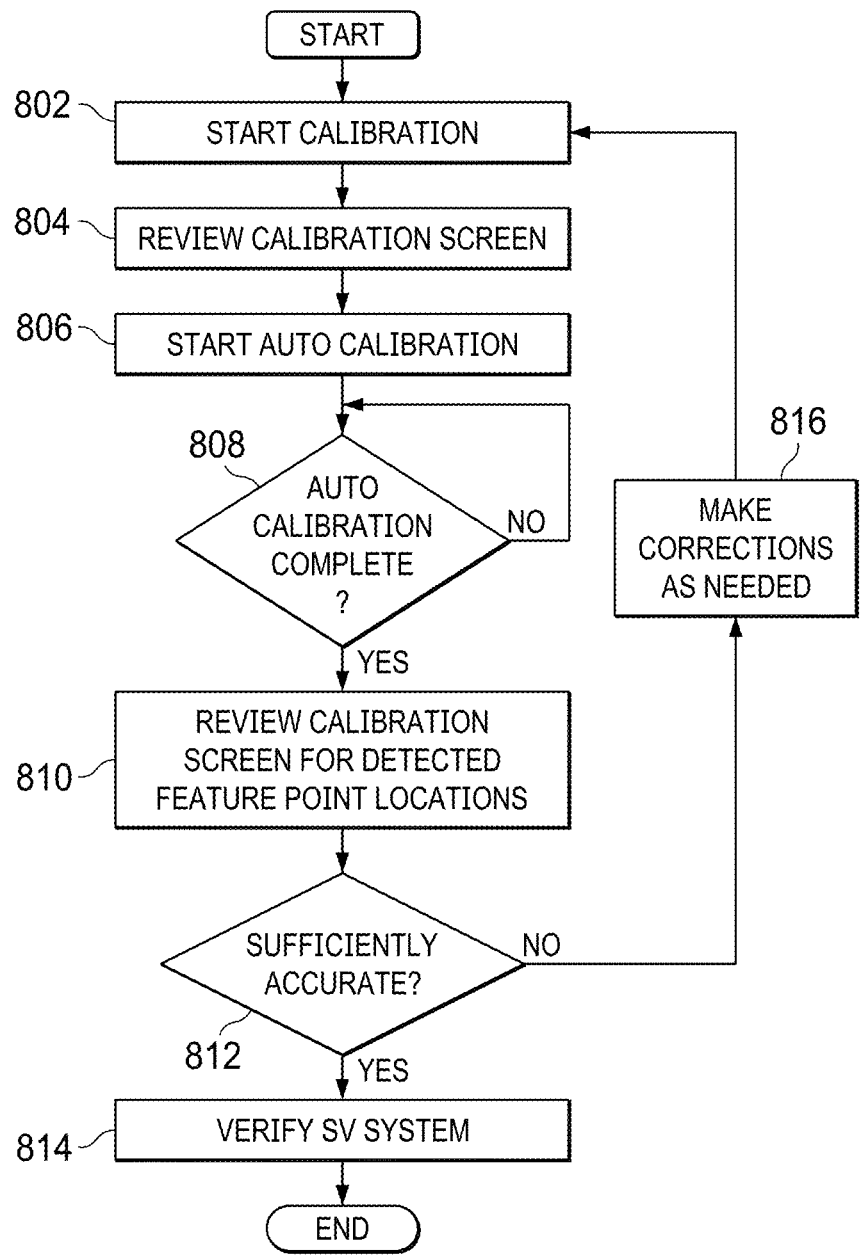

FIG. 8 is a flow diagram of method for generating calibration parameters for an automotive SV camera system such as the automotive SV camera system 200 of FIG. 2 that may be performed by a technician to calibrate the system, e.g., during production or after maintenance. The method assumes that predetermined platform dependent parameters are available in nonvolatile memory either in the system itself or on removable media. The method also assumes that the four calibration charts are placed around the vehicle housing the automotive SV camera system according to the distances specified in the platform dependent parameters.

The technician initially starts 802 the calibration process via an interface defined by the vehicle manufacturer. The calibration process presents a calibration screen with overlaid bounding boxes on a display device in the vehicle and the technician reviews 804 the calibration screen content to verify the placement of the calibration charts, the lighting conditions, etc. A calibration screen is previously described herein. The technician then starts 806 the automatic calibration parameter generation via an interface defined by the vehicle manufacturer and waits 808 for completion. As part of the automatic calibration parameter generation, feature points of the calibration charts are detected and are overlaid on the calibration screen. Also, at the end of the automatic calibration parameter generation process, the calibration parameters are stored in nonvolatile memory in the automotive SV camera system. Automatic generation of calibration parameters is previously described herein.

Figure 9A:
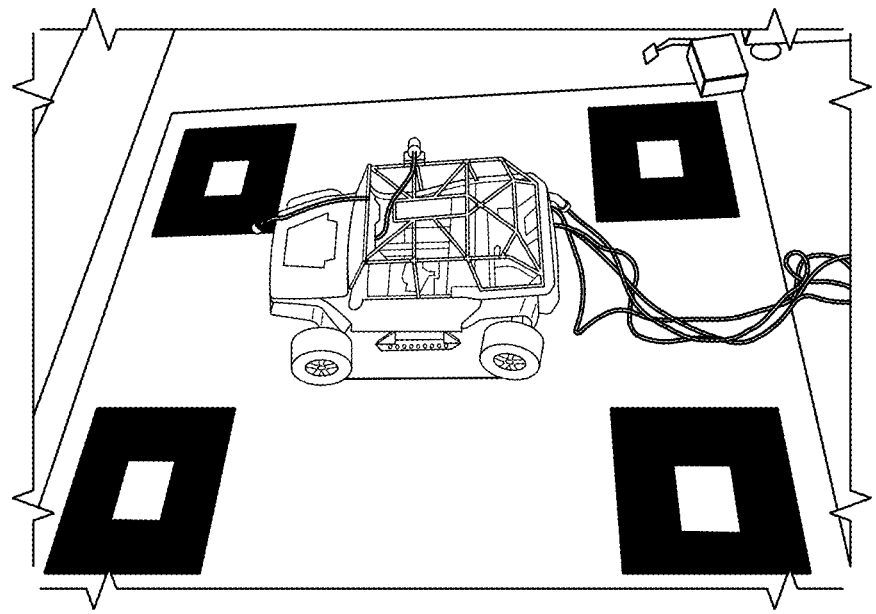
FIGS. 9A, 9B, 10A, and 10B are examples of calibration arrangements and corresponding SV images of the calibration arrangements after the automotive SV camera system is calibrated.
Figure 9B:
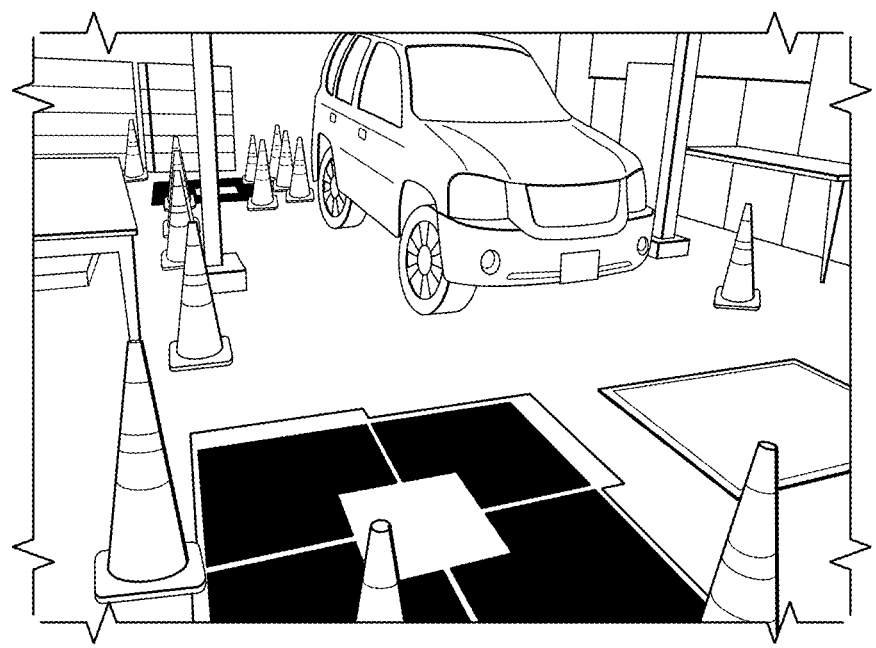
Figure 10A:
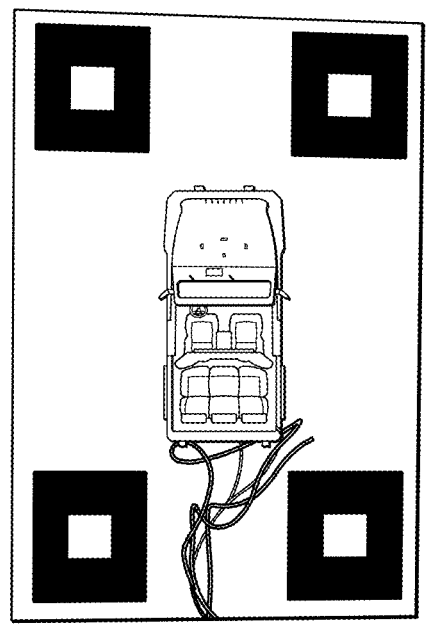
Figure 10B:
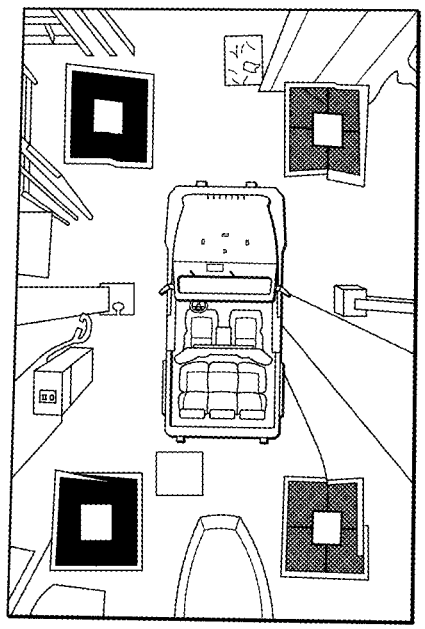

The technician reviews 810 the calibration screen to verify the accuracy of the locations of the detected feature points. The accuracy measure used by the technician may be defined by the manufacturer. For example, the manufacturer may specify the number of pixels the location of a detected feature point may vary from the actual location. The technician may review zoomed-in views of the detected feature point locations to check the pixel level accuracy. If the feature points are sufficiently accurate 812, then the technician verifies 814 that the SV system operates correctly with the generated calibration parameters. The technician may verify system operation by starting the SV system and viewing the SV images on the display device. FIGS. 9A and 9B are examples of a calibration arrangement for, respectively, a scaled model of a jeep and for an actual jeep. FIGS. 10A and 10B show the respective SV images output by the automotive SV camera system after calibration parameters are successfully generated.

If the placement of the feature points is not sufficiently accurate 812, then the technician may make corrections 816 in the calibration area as needed and restart 802 the calibration process. For example, the technician may need to adjust the lighting or move one or more calibration charts or remove a previously unnoticed object from the calibration area.

The methods of FIG. 7 and FIG. 8 may also be used to determine the platform dependent parameters such as the bounding box and chart sizes and positions for a platform. A technician may use an offline process to determine candidate values, store the candidate values on removable media, plug the removable media into the automotive SV camera system, and perform the method of FIG. 8 while the system performs the method of FIG. 7 to test the candidate values. Once the calibration is sufficiently accurate for a set of candidate values, the values may be stored in nonvolatile memory of the automotive SV camera system in each manufactured platform to be used for initial calibration as part of the manufacturing process and for recalibration after maintenance of the camera system.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein in which the calibration chart is a composed of a white square positioned in the center of a larger black square. One of ordinary skill in the art will understand embodiments in which other suitable calibration charts are used. Some examples of other suitable calibration charts may be found in U.S. patent application Ser. No. 15/294,369 previously cited herein.

In another example, embodiments have been described herein in which the automotive SV camera system includes four cameras with fish-eye lenses. One of ordinary skill in the art will understand embodiments in which the cameras have other lens types and/or more cameras are included in the system.

In another example, embodiments have been described herein in which a display device installed in the vehicle is used to display the calibration screen. One of ordinary skill in the art will be understand embodiments in which the display device is connected to the automotive SV camera system by a wired or wireless interface.

In another example, data describing what portion of a bounding box should be displayed for a given pose angle of a camera may be stored along with the bounding box size and position. This data may be used to update the bounding box overlay on the calibration screen as the technician adjusts the corresponding camera pose angle.

In another example, embodiments have been described herein in reference to automotive SV camera systems. One of ordinary skill in the art will understand embodiments for vehicles other than automobiles that incorporate an SV camera system, such as, for example, robots, aerial vehicles such as drones, farm equipment such as harvesters, combines, and tractors, warehouse vehicles such as forklifts, water vehicles such as boats and barges, and helmets.

Software instructions implementing all or portions of the methods described herein may be initially stored in a computer-readable medium and loaded and executed by one or more processors. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in systems may be referred to by different names and/or may be combined in ways not shown herein without departing from the described functionality. This document does not intend to distinguish between components that differ in name but not function. In the description and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if one device couples to another device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the invention.

What is claimed is:

1. A method comprising:
capturing a first video stream from a first camera of a plurality of cameras comprised in a surround view (SV) camera system, wherein the first video stream captures a first image of a fourth calibration chart and of a first calibration chart in a field of view (FOV) of the first camera;
capturing a second video stream from a second camera comprised in the SV camera system, wherein the second video stream captures a second image of the first calibration chart and of a second calibration chart in a FOV of the second camera;
capturing a third video stream from a third camera comprised in the SV camera system, wherein the third video stream captures a third image of the second calibration chart and of a third calibration chart in a FOV of the third camera;
capturing a fourth video stream from a fourth camera comprised in the SV camera system, wherein the fourth video stream captures a fourth image of the third calibration chart and of the fourth calibration chart in a FOV of the fourth camera;
bounding the first calibration chart in the first image with a first bounding box;
bounding the first calibration chart in the second image with a second bounding box;
bounding the second calibration chart in the second image with a third bounding box;
bounding the second calibration chart in the third image with a fourth bounding box;
bounding the third calibration chart in the third image with a fifth bounding box;
bounding the third calibration chart in the fourth image with a sixth bounding box;
bounding the fourth calibration chart in the fourth image with a seventh bounding box;
bounding the fourth calibration chart in the first image with an eighth bounding box;
aligning the first calibration chart on a vertical axis and a horizontal axis of the first calibration chart based on the first and second bounding boxes to generate an aligned first calibration chart;
aligning the second calibration chart on a vertical axis and a horizontal axis of the second calibration chart based on the third and fourth bounding boxes to generate an aligned second calibration chart;
aligning the third calibration chart on a vertical axis and a horizontal axis of the third calibration chart based on the fifth and sixth bounding boxes to generate an aligned third calibration chart;
aligning the fourth calibration chart on a vertical axis and a horizontal axis of the fourth calibration chart based on the seventh and eighth bounding boxes to generate an aligned fourth calibration chart;
detecting a first feature point within the first bounding box of the aligned first calibration chart in the first image and detecting a second feature point within the second bounding box of the aligned first calibration chart in the second image;
detecting a third feature point within the third bounding box of the aligned second calibration chart in the second image and detecting a fourth feature point within the fourth bounding box of the aligned second calibration chart in the third image;
detecting a fifth feature point within the fifth bounding box of the aligned third calibration chart in the third image and detecting a sixth feature point within the sixth bounding box of the aligned third calibration chart in the fourth image;
detecting a seventh feature point within the seventh bounding box of the aligned fourth calibration chart in the fourth image and detecting an eighth feature point within the eighth bounding box of the aligned fourth calibration chart in the first image;
determining a location for each of the first, second, third, fourth, fifth, sixth, seventh, and eighth feature points;
generating a first set of matrices based on the detected first feature point, the detected second feature point, and based on the determined locations of the first and second feature points;
generating a second set of matrices based on the detected third feature point and, the detected fourth feature point, and based on the determined locations of the third and fourth feature points;
generating a third set of matrices based on the detected fifth feature point and, the detected sixth feature point, and based on the determined locations of the detected fifth and sixth feature points;
generating a fourth set of matrices based on the detected seventh feature point and, the detected eighth feature point, and based on the determined locations of the detected seventh and eighth feature points;
displaying images of the first, second, third, and fourth video streams concurrently on a display device with the first bounding box overlaid on the first aligned calibration chart with the detected first feature point in the first image, the second bounding box overlaid on the first aligned calibration chart with the detected second feature point in the second image, the third bounding box overlaid on the aligned second calibration chart with the third detected feature point in the second image, the fourth bounding box overlaid on the aligned second calibration chart with the fourth detected feature point in the third image, the fifth bounding box overlaid on the aligned third calibration chart with the fifth detected feature point in the third image, the sixth bounding box overlaid on the third aligned calibration chart with the sixth detected feature point in the fourth image, the seventh bounding box overlaid on the fourth aligned calibration chart with the seventh detected feature point in the fourth image, and the eighth bounding box overlaid on the fourth aligned calibration chart with the eighth detected feature point in the first image;
computing calibration parameters for the first camera in the SV camera system based on the first set of matrices and a camera intrinsic parameter for the first camera;
computing calibration parameters for the second camera in the SV camera system based on the second set of matrices and a camera intrinsic parameter for the second camera;
computing calibration parameters for the third camera in the SV camera system based on the third set of matrices and a camera intrinsic parameter for the third camera;
computing calibration parameters for the fourth camera in the SV camera system based on the fourth set of matrices and a camera intrinsic parameter for the fourth camera; and
storing the calibration parameters for the first, second, third and fourth cameras in the SV camera system.

2. The method of claim 1, wherein the display device is comprised in a vehicle comprising the SV camera system.

3. The method of claim 1, wherein detecting feature points is performed responsive to user input indicating the calibration parameters are to be computed.

4. The method of claim 1, wherein each camera of the first, second, third and fourth cameras is equipped with a fish-eye lens.

5. A surround view (SV) camera system comprising:
a first calibration chart, a second calibration chart, a third calibration chart and a fourth calibration chart;
a first camera, a second camera, a third camera and a fourth camera;
a display device;
a memory storing software instructions for generating calibration parameters for the SV camera system, wherein the software instructions comprise software instructions to:
capture a first video image from the first camera, wherein the first video image captures a fourth calibration chart and a first calibration chart;
capture a second video image from the second camera, wherein the second video image captures the first calibration chart and a second calibration chart;
capture a third video image from the third camera, wherein the third video image captures the second calibration chart and a third calibration chart;
capture a fourth video image from the third camera, wherein the fourth video image captures the third calibration chart and the fourth calibration chart;
bound the first calibration chart in the first image with a first bounding box;
bound the first calibration chart in the second image with a second bounding box;
bound the second calibration chart in the second image with a third bounding box;
bound the second calibration chart in the third image with a fourth bounding box;
bound the third calibration chart in the third image with a fifth bounding box;
bound the third calibration chart in the fourth image with a sixth bounding box;
bound the fourth calibration chart in the fourth image with a seventh bounding box;
bound the fourth calibration chart in the first image with an eighth bounding box;
align the first calibration chart on a vertical axis and a horizontal axis of the first calibration chart based on the first and second bounding boxes to generate an aligned first calibration chart;
align the second calibration chart on a vertical axis and a horizontal axis of the second calibration chart based on the third and fourth bounding boxes to generate an aligned second calibration chart;
align the third calibration chart on a vertical axis and a horizontal axis of the third calibration chart based on the fifth and sixth bounding boxes to generate an aligned third calibration chart;
align the fourth calibration chart on a vertical axis and a horizontal axis of the fourth calibration chart based on the seventh and eighth bounding boxes to generate an aligned fourth calibration chart;
detect a first feature point within the first bounding box of the aligned first calibration chart in the first video image, and detect a second feature point within the second bounding box of the aligned first calibration chart in the second video image;

detect a third feature point within the third bounding box of the aligned second calibration chart in the second video image, and detect a fourth feature point within the fourth bounding box of the aligned second calibration chart in the third video image;

detect a fifth feature point within the fifth bounding box of the aligned third calibration chart in the third video image, and detect a sixth feature point within the sixth bounding box of the aligned third calibration chart in the fourth video image;

detect a seventh feature point within the seventh bounding box of the aligned fourth calibration chart in the fourth video image, and detect an eighth feature point within the eighth bounding box of the aligned fourth calibration chart in the first video image;

determine a location for each of the first, second, third, fourth, fifth, sixth, seventh, and eighth feature points;

generate a first set of matrices based on the detected first feature point, the detected second feature point, and based on the determined locations of the first and second feature points;

generate a second set of matrices based on the detected third feature point, the detected fourth feature point, and based on the determined locations of the third and fourth feature points;

generate a third set of matrices based on the detected fifth feature point, the detected sixth feature point, and based on the determined locations of the fifth and sixth feature points;

generate a fourth set of matrices based on the detected seventh feature point, the detected eighth feature point, and based on the determined locations of the seventh and eighth feature points;

display the first, second, third, and fourth video images concurrently in the display device with the first bounding box overlaid on the first aligned calibration chart with the detected first feature point in the first image, the second bounding box overlaid on the first aligned calibration chart with the detected second feature point in the second image, the third bounding box overlaid on the aligned second calibration chart with the third detected feature point in the second image, the fourth bounding box overlaid on the aligned second calibration chart with the fourth detected feature point in the third image, the fifth bounding box overlaid on the aligned third calibration chart with the fifth detected feature point in the third image, the sixth bounding box overlaid on the third aligned calibration chart with the sixth detected feature point in the fourth image, the seventh bounding box overlaid on the fourth aligned calibration chart with the seventh detected feature point in the fourth image, and the eighth bounding box overlaid on the fourth aligned calibration chart with the eighth detected feature point in the first image;

compute calibration parameters for the first camera in the SV camera system based on the first set of matrices and camera intrinsic parameters for the first camera;

compute calibration parameters for the second camera in the SV camera system based on the second set of matrices and camera intrinsic parameters for the second camera;

compute calibration parameters for the third camera in the SV camera system based on the third set of matrices and camera intrinsic parameters for the third camera;

compute calibration parameters for the fourth camera in the SV camera system based on the fourth set of matrices and camera intrinsic parameters for the fourth camera; and store the calibration parameters in the SV camera system; and a processor coupled to the memory to execute the software instructions.

6. The SV camera system of claim 5, comprising a vehicle, wherein the display device is comprised by the vehicle.

7. The SV camera system of claim 5, wherein software instructions to detect feature points are performed responsive to user input indicating the calibration parameters are to be computed.

8. The SV camera system of claim 5, wherein each camera of the first, second, third and fourth cameras is equipped with a fish-eye lens.

9. The SV camera system of claim 5, wherein the first set of matrices includes a first rotation matrix and a first translation matrix, the second set of matrices includes a second rotation matrix and a second translation matrix, the third set of matrices includes a third rotation matrix and a third translation matrix, and the fourth set of matrices includes a fourth rotation matrix and a fourth translation matrix.

10. The method of claim 1, wherein the first, second, third, fourth, fifth, sixth, seventh, and eighth bounding boxes are equal in size.

11. The method of claim 1, wherein the first, second, third, fourth, fifth, sixth, seventh, and eighth bounding boxes are not equal in size.

12. The method of claim 1, wherein a size of the first bounding box is based on an accuracy of the detecting the first feature point.

* * * * *